June 2, 1953
E. A. PUERNER
2,640,322
HYDRAULIC STEERING MECHANISM
Filed Jan. 2, 1951
2 Sheets-Sheet 1
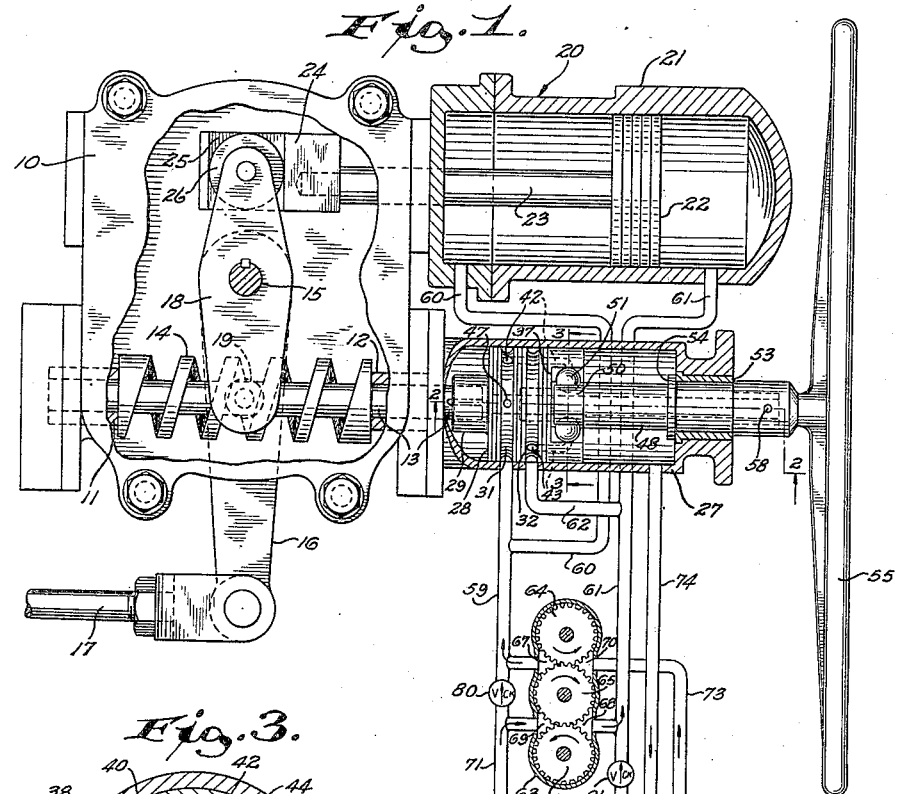
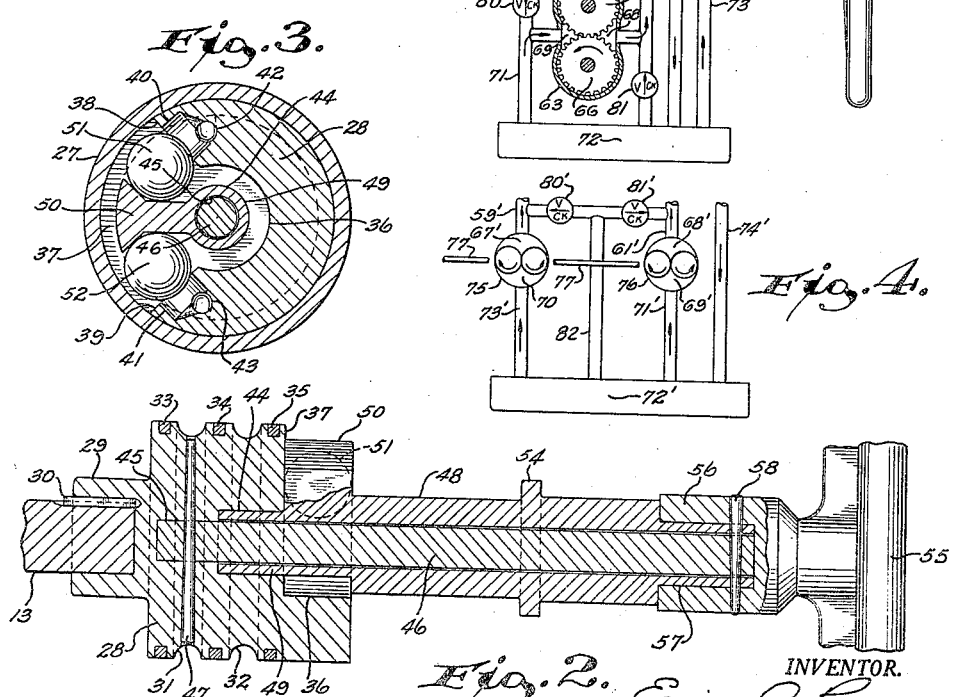
INVENTOR.
Erving A. Puerner
BY
Morsell & Morsell
ATTORNEYS.

June 2, 1953        E. A. PUERNER        2,640,322
HYDRAULIC STEERING MECHANISM
Filed Jan. 2, 1951                                    2 Sheets-Sheet 2
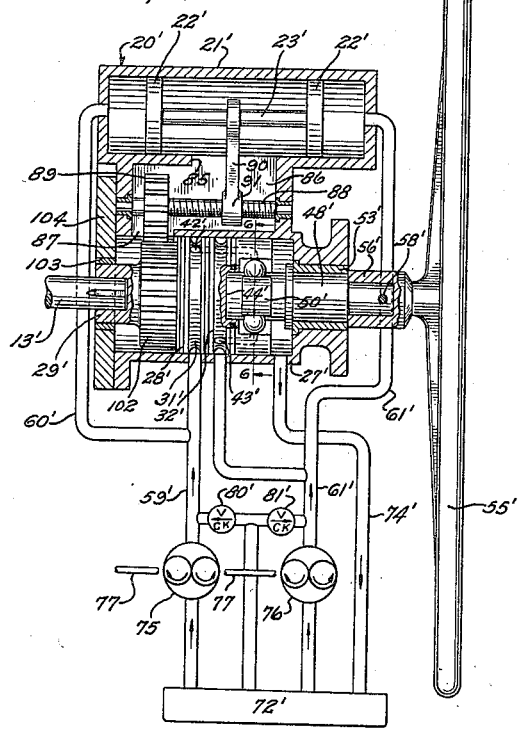
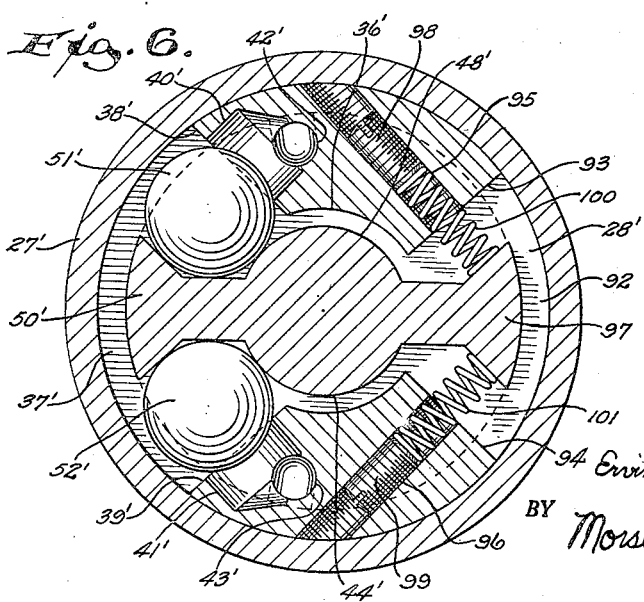
INVENTOR.
Erving A. Puerner,
BY Morsell & Morsell
ATTORNEYS.

Patented June 2, 1953

2,640,322

UNITED STATES PATENT OFFICE 2,640,322

HYDRAULIC STEERING MECHANISM

Erving A. Puerner, Milwaukee, Wis., assignor to Shallcross Controls, Inc., Milwaukee, Wis., a corporation of Wisconsin Application January 2, 1951, Serial No. 203,915

19 Claims. (Cl. 60—52)

This invention relates to improvements in hydraulic steering mechanisms.

There have been a number of hydraulic steering mechanisms developed heretofore, but not any of these has been entirely satisfactory. Many of the prior hydraulic steering mechanisms have incorporated therein a four-way type valve for controlling the movements of a double acting piston. The conventional four-way valves have relatively movable parts therein formed with ports or grooves which are moved into and out of registration. Due to the fact that during movement of these parts, fluid under high pressure is caused to move through partially opened apertures or grooves therein, wire drawing or erosion of the margins of said grooves or apertures results. This greatly reduces the life of the valve. A common method of reducing the expense of wire drawing is to construct the valve in a manner such that the more expensive parts of the valve are made of the hardest metal and the more cheaply manufactured parts thereof are made of softer metal so that the wear will occur on the latter parts.

Another disadvantage of prior hydraulic steering mechanisms is that upon failure of the fluid pressure the system is locked against movement due to the entrapment of hydraulic fluid in the cylinder which prevents movement of the piston. This, of course, prevents any steering of the vehicle. The potential dangers of such a mechanism are obvious.

Another objection to prior steering mechanisms is the fact that said mechanisms fail to transmit to the driver any "road feel" or resistance which the steering mechanism encounters due to road conditions or the like in making a turn.

Another disadvantage of certain of the prior steering mechanisms is the fact that the steering wheel and its shaft move axially when turned. This makes mounting of the steering worm on thrust bearings difficult and expensive.

With the above in mind, it is a principal object of the present invention to provide an improved hydraulic steering mechanism which is so constructed that if, for any reason, the fluid pressure should fail, the vehicle in which said mechanism is embodied can still be driven manually.

A further object of the invention is to provide an improved hydraulic steering mechanism having embodied therein ball type valves which provide a large opening for a relatively small amount of movement off the valve seat and thereby substantially entirely avoid wire drawing of the valve parts.

A further object of the invention is to provide an improved hydraulic steering mechanism of the class described provided with means for transmitting "road feel" to the driver through the steering wheel, said mechanism also being constructed in such a manner that there is no axial movement of the steering wheel or its shaft at any time.

A further object of the invention is to provide an improved hydraulic steering mechanism which is simple in construction and which is inexpensive to manufacture because no special tooling is required therefor.

A further object of the invention is to provide an improved valve and pumping system which is adapted for use with most types of hydraulic steering gears and to provide an improved hydraulic steering mechanism which is connectible to the steering column of any manual steering mechanism to provide power steering therefor.

A further object of the invention is to provide an improved hydraulic steering mechanism of the class described which is strong and durable, which is compact, and which is otherwise well adapted for the purposes described.

With the above and other objects in view, the invention consists of the improved hydraulic steering mechanism and all of its parts and combinations as set forth in the claims and all equivalents thereof.

In the drawing accompanying and forming a part of this specification, wherein are shown several embodiments of the invention, and wherein like characters of reference indicate the same parts in all of the views:

Fig. 1 is a fragmentary side elevational view of the improved hydraulic steering mechanism, parts being broken away and shown in section;

Fig. 2 is a longitudinal vertical sectional view taken approximately along the line 2—2 of Fig. 1;

Fig. 3 is a transverse vertical sectional view taken along the line 3—3 of Fig. 1;

Fig. 4 is a fragmentary diagrammatic view of an alternative form of pumping arrangement;

Fig. 5 is a fragmentary side elevational view of a modified form of the invention, parts being broken away and shown in section; and Fig. 6 is a transverse vertical sectional view taken along the line 6—6 of Fig. 5.

Referring more particularly to Fig. 1 of the drawing the numeral 10 indicates an enclosed gear casing provided internally with a pair of spaced coaxial bearings 11 and 12. A shaft 13 is rotatably mounted in the bearings 11 and 12 and is formed between said bearings with a worm gear 14 having a relatively steep pitch. The worm gear 14 is formed at its opposite ends with parallel annular end faces which abut the inner ends of the bearings 11 and 12 to prevent axial movement of the shaft 13.

A shaft 15 extends transversely within the casing 10 and is rotatably mounted in suitable bearings (not shown). The shaft 15 extends exteriorly of the casing 10, and keyed or otherwise fixed to said shaft exteriorly of the casing is a pitman arm 16. The arm 16 is pivotally connected to a linkage 17 which may be dirigibly connected to the front wheels of a vehicle. Within the casing 10 a lever 18 is keyed intermediate its length onto the shaft 15, as shown, and is movable in a plane parallel with the axis of the shaft 13. The lever 18 has one end positioned adjacent the worm 14 and has formed on said end portion a frusto conical lug 19 which projects toward the worm 14 and fits between a pair of adjacent convolutions thereof to act as a cam follower in a manner well known in the art when driven by the worm. The pitch of the worm is such, however, that said worm can be rotated by movement of the lug 19 axially of said worm. Mounted on the casing 10 is an hydraulic ram 20 having a cylinder 21 in which a piston 22 having a piston rod 23 is reciprocatably mounted. The piston rod 23 is parallel with the shaft 13 and slidably extends through the wall of the casing 10. The end of the piston rod within the casing 10 is provided with a cross head 24 which is formed with a rectangular groove 25 to receive a wheel or roller 26 which is rotatably connected to the end of the lever 18 opposite the lug 19.

Mounted on the exterior of the housing 10 coaxially with the shaft 13 is a cylindrical control housing 27. The adjacent end of the shaft 13 extends rotatably through the wall of the casing 10 and into the control housing 27, as shown. A cylindrical valve block is positioned in the control housing 27 and is formed at one end with a coaxial tubular extension 29 for non-rotatably receiving the end of the shaft 13. In the drawing the shaft 13 is keyed to the tubular extension 29 by means of a key 30 (see Fig. 2). The valve block 28 is formed with a pair of spaced circumferential grooves 31 and 32 and is provided with sealing rings 33, 34 and 35 to provide a rotatable sealing connection between the valve block 28 and the control housing 27 at each side of each of the grooves 31 and 32.

In its end face opposite the sleeve 29 the control block 28 is formed with an axial cylindrical recess 36, and a sectoral portion 37 of the end of the control block radially outwardly of the recess 36 is cut away, as shown in Figs. 1 and 3, to form axially extending shoulders or faces 38 and 39. The faces 38 and 39 preferably lie in planes which are parallel with the axis of the block 28 and are disposed angularly with respect to each other, as shown. The faces 38 and 39 are respectively formed with bores 40 and 41 to provide circular valve seats in said faces. The control block 28 is formed with a passage 42 which communicates between the bore 40 and the groove 31 as shown in Figs. 1 and 3. The block 28 is also formed with a passage 43 which communicates between the bore 41 and the groove 32.

The control block 28 is formed with an axial bore portion 44 (see Fig. 2) smaller than the recess 36 and with a second axial bore portion 45 of smaller diameter than the bore portion 44. An elongated torsion rod 46 has one end positioned in the bore portion 45 and is fixed therein as by a tapered pin 47 extending transversely through the block 28 and said rod. A control sleeve 48, having an inside diameter slightly larger than the diameter of the rod 46, surrounds said rod and has an end portion of reduced outer diameter 49 rotatably positioned in the bore portion 44.

Formed on and extending radially outwardly from the portion 49 of the control sleeve 48 is a blade 50 which is normally positioned in the cutaway portion 37 midway between the faces 38 and 39. The blade 50 is preferably enlarged adjacent its outer end as shown in Fig. 3. Positioned between the face 38 and the blade 50 is a ball 51 which is adapted to sealingly seat in the end of the bore 40 when pressed thereagainst by the blade 50. When the blade 50 is in its normal neutral position, however, the ball 51, as shown in Fig. 3, is not so pressed and the bore 40 is in communication with the cutaway portion 37. A ball 52 is similarly positioned between the blade 50 and the open end of the bore 41, said ball being adapted to seal the end of the bore 41 when pressed thereagainst by the blade 50. As shown in Fig. 3, the ball 52 is not sealingly pressed against the open end of the bore 41 when the blade 50 is in neutral position, and the bore 41 communicates with the cutaway portion 37 when the blade is in neutral position.

The outer end wall of the control housing 27 is provided with an axial bearing sleeve 53 through which the control sleeve 48 rotatably extends. The sleeve 48 is formed with a thrust collar 54 which abuts the inner end of the bearing 53 as shown. A steering wheel 55 is formed with an axial connecting sleeve 56, and the control sleeve 48 is formed at its outer end with a portion of reduced external diameter 57 which fits telescopically into the sleeve 56, as shown in Fig. 2. Outwardly of the bearing 53, the sleeve 56 and the outer ends of the control sleeve 48 and torsion rod 46 are fixedly connected, as by the tapered pin 58 extending transversely therethrough, shown in Fig. 2.

A conduit 59 communicates through a suitable aperture in the control housing 27 with the groove 31 of the valve block 28. The conduit 59 also communicates with one end of a conduit 60 which communicates at its other end with one end of the interior of the cylinder 21. A conduit 61 communicates at one end with the opposite end of the interior of the cylinder 21 and also communicates with one end of a conduit 62, the other end of which communicates with the groove 32 of the valve block 28 through a suitable aperture in the control housing 27. The conduits 59 and 61 communicate with separate sources of fluid under pressure preferably in the nature of positive displacement pumps.

Fig. 1 shows an improved unitary pump assemblage providing two separate sources of fluid under pressure. A pump housing 63 has rotatably mounted therein three gear type impellers 64, 65 and 66. The gear 65 may be suitably driven and meshes with the gears 64 and 66 to provide driving engagement therefor. It is apparent that rotation of the gears in the directions indicated provides pressure in chambers 67 and 68. The conduit 59 communicates with the pressure chamber 67 as shown, and the conduit 61 communicates with the pressure chamber 68, as shown. It is obvious that by rotation of the gears in the directions indicated suction chambers 69 and 79 are also formed. A conduit 71 communicates between the suction chamber 69 and a source of fluid or sump 72, and a conduit 73 communicates between the suction chamber 70 and the sump 72, as shown. A return conduit 74 communicates between the outer end of the interior of the control housing 27 and the sump 72. An inlet check valve 80 connects the conduit 59 with the sump 72 and may do so via the conduit 71, as shown. An inlet check valve 81 connects the conduit 61 with the sump 72, as shown.

Fig. 4 shows a modified form of pump arrangement, wherein two separate positive displacement pump assemblages 75 and 76 are driven by a common shaft 77, the pump 75 drawing fluid from the sump 72' through the conduit 73' and discharging said fluid into the conduit 59'; and the pump 76 drawing fluid from the sump 72' through the conduit 71' and discharging said fluid into the conduit 61'. In Fig. 4 the parts indicated by primed numerals are analogous to the parts indicated by the same unprimed numerals in Figs. 1 to 3. A conduit 82 provides communication between the sump 72' and a pair of inlet check valves 80' and 81' as shown, the valve 80' being connected to the conduit 59' and the valve 81' being connected to the conduit 61'.

*Operation*

With the parts in the positions shown in Figs. 1 and 3, fluid flows from the pressure chamber 67 through the conduit 59, the groove 31, the passage 42 and the bore 40, and flows freely from the mouth of the bore 40 into the interior of the control housing 27. This fluid flows back to the sump 72 through the conduit 74. Because of the free flow of the fluid along the path just described, no substantial pressures are built up in the conduits 59 and 60 or cylinder 21. Similarly, fluid flows from the pressure chamber 68 through the conduits 61 and 62, the groove 32, the passage 43 and the bore 41 into the interior of the control housing 27. The fluid issuing from the mouth of the bore 41 also returns to the sump 72, via the conduit 74. The free flow of the fluid through the path just described prevents a building up of any substantial pressures in the conduits 61 and 62 or in the cylinder 21.

Manual steering is accomplished by turning the wheel 55 to cause simultaneous rotation therewith of the control sleeve 48, the torsion rod 46, the valve block 28 and the shaft 13. Rotation of the worm 14 with the shaft 13 moves the cam follower 19 and causes the lever 18, along with the shaft 15, to rotate. Rotation of the lever 18 causes movement of the crosshead 24 and of the piston 22, while rotation of the shaft 15 causes the pitman arm 16 to swing therewith in the same rotative direction to actuate the steering linkage 17 in a direction corresponding to the direction of rotation of the hand wheel 55.

It will be noted that the torsion rod 46 is the only member which is fixedly connected to both the steering wheel 55 and the valve block 28. This rod is deformable and is made of material which will transmit a predetermined amount of rotational force from the wheel 55 to the valve block 28 without deformation. However, when the resistance to movement of the steering linkage 17 is such that the rotative force required to be applied to the worm 14 to overcome said resistance and move said linkage is in excess of the predetermined force which the rod 46 can withstand without deformation, turning of the wheel 55 in a clockwise direction as viewed from the right of Fig. 1, will cause deformation or twisting of the rod 46. As the rod 46 so twists, the sleeve 48 and the blade 50 rotate with the wheel in a clockwise direction relative to the valve block 28.

Referring to Fig. 3, rotation of the blade 50 in a clockwise direction causes said blade to press the ball 51 onto its seat in the mouth of the bore 40. This forms a direct driving connection between the wheel 55 and the valve block 28, it being apparent that the rod 46 provides a spring load which tends to return the blade 50 to its normal neutral position. A lost motion connection between the sleeve 48 and the valve block 28 is provided by the blade 50 and balls 51 and 52 positioned between the faces 38 and 39.

When the ball 51 is pressed onto its seat by the blade 50, the fluid from the conduit 59 can no longer escape into the housing 27 through the bore 40, and as a result the fluid from the pressure chamber 67 flows through the conduits 59 and 60 into the cylinder 21 at the left hand side of the piston 22. This causes the piston 22 to immediately move toward the right and to pull with it the piston rod 23 and crosshead 24. Movement of the crosshead 24 to the right causes clockwise rotation of the lever 18 and clockwise swinging movement of the pitman arm 16, which in turn causes movement toward the left of the linkage 17.

Clockwise rotation of the lever 18 causes clockwise rotation of the worm 14 by the lug 19, and the valve block 28 moves with said worm to move the face 38 of the valve block away from the blade 50. Movement of the valve block 28 in a clockwise direction untwists the rod 46 and returns the blade 50 to its normal neutral position. If, while the rod 46 is twisted, the road resistance decreases to a point below that which causes deformation of said rod, the valve block 28 is moved by the rod in a clockwise direction relative to the blade 50 until said rod is no longer distorted and the blade is again in the neutral position shown in Fig. 3. It is apparent that as the valve block 28 so moves relative to the blade 50, the ball 51 is moved off its seat by the fluid pressure in the conduit 59, groove 31, passage 42 and the bore 40. As the ball 51 moves off its seat, the pressure in the conduits 59 and 60 and on the left hand side of the piston 22 is dissipated by the free flow of fluid out of the mouth of the bore 40. The dissipation of the pressure in the cylinder 21 at the left hand side of the piston 22 stops the aid to steering provided by the piston 22.

A similar action takes place when the hand wheel 55 is turned in a counterclockwise direction as viewed from the right in Fig. 1. When the road resistance to movement of the steering linkage 17 exceeds the predetermined amount which the torsion rod 46 can withstand without deformation, counterclockwise rotation of the wheel 55 causes the blade 50 to press the ball 52 onto its seat in the mouth of the bore 39. This causes fluid to flow from the pressure chamber 68 through the conduit 61 and into the cylinder 21 at the right hand side of the piston 22. Movement of the piston 22, piston rod 23, and the crosshead 25 to the left results and causes counterclockwise rotation of the lever 18 and the shaft 15. The counterclockwise rotation of the shaft causes counterclockwise swinging movement of the pitman arm 16 and movement of the linkage 17 to the right. As the lever 18 is rotated in a counterclockwise direction, the worm 14 is also rotated in a counterclockwise direction by the lug 19 to thereby similarly rotate the valve block 28 to move the face 39 away from the blade 50. If while the rod 46 is so twisted the road resistance to movement of the linkage 17 drops below that which causes distortion of the torsion rod 46, said rod will return to its normal undeformed state, and in doing so will rotate the valve block 28 in a counterclockwise direction relative to the blade 50 until said blade is again in its neutral position shown in Fig. 3. Positioning of the blade 50 as shown in Fig. 3 permits the pressure from the conduits 61 and 62, groove 32, passage 43 and bore 41 to move the ball 52 off its seat to allow fluid to issue from the bore 41 into the casing 27. This causes dissipation of the fluid pressures in conduits 61 and 62 and in the cylinder 21 at the right hand side of the piston 22, and stops the aid to steering provided by said piston.

From the foregoing it is apparent that with the use of the improved hydraulic steering mechanism, hydraulic steering aid is provided only at such times as when the resistance to movement of the steering linkage exceeds the torque which can be transmitted by the torsion rod 46 without deformation. If the steering linkage does not exert sufficient resistance to twist the torsion rod 46 and thereby cause one of the balls to be pressed against its seat, the manual torque causing rotation of the hand wheel 55 will be the only force to cause actuation of the steering linkage, and no hydraulic aid will result. The purpose of this feature is to allow a certain amount of "road feel" to be transmitted to the driver or operator of the steering wheel 55, and to thereby provide a valuable aid to accurate steering.

If for any reason the fluid pressure in the conduits 59 or 61 should fail by reason of a pump failure or for any other reason, the improved steering mechanism can still be manually steered even though no hydraulic steering aid is provided. At such times the piston 22 can be moved freely in the cylinder 21, due to the fact that there is no entrapment of fluid therein. During movement of the piston fluid can be drawn into one end thereof through one or the other of the check valves 80 or 81, even though one of the balls is pressed against its seat. The improved steering mechanism can always be operated manually and is never locked because of failure of the fluid pressure therein.

The balls 51 and 52 provide a relatively large opening for a relatively small movement away from their seats, and the use of ball type valves in the improved steering mechanism eliminates the wire drawing which ordinarily occurs in conventional four-way valves wherein movement of relatively slidable parts causes valve lands to uncover or to close pressure ports. The improved steering mechanism is adapted for use with a wide variety of hydraulic steering gears and is rugged in construction. It is also apparent that turning of the hand wheel 55 causes no axial movement of said wheel.

Figs. 5 and 6 disclose a modified form of the invention which is particularly well adapted for converting a manually powered steering gear to an hydraulically powered steering gear. The parts in Figs. 5 and 6 which are indicated by primed numerals are analogous to the parts of the principal form of the invention indicated by the same unprimed numerals.

In Fig. 5 the casings of the hydraulic ram 20' and of the control housing 27' are formed integral as a compact unit. The hydraulic ram 20' is provided with a cylinder 21' and with a pair of spaced pistons 22' which are connected by means of a connecting rod 23'. The cylinder 21' is formed with an aperture 85 in its side wall intermediate its length, and said aperture communicates with an enclosed transversely extending chamber 86 which in turn communicates with a suitable opening 87 in the side wall of the control housing 27' adjacent one end thereof. Rotatably mounted in suitable bearings in the opposite wall portions of the chamber 86 is a screw 88 having a pinion 89 fixed thereon adjacent the opening 87. A force bar 90 is fixed to an intermediate portion of the piston rod 23' and extends at a right angle thereto through the aperture 85 as shown. The end of the force bar is preferably formed with an integral nut 91 which is threaded on the screw 88. The pitch of the thread on the screw 88 and in the nut 91 is sufficiently steep so that the screw 88 will be rotated by axial movement of the nut 91. If desired the screw 88 and the nut 91 may be replaced by a worm and a frusto-conical follower, such as the worm 14 and follower 19 of Fig. 1, respectively. The type of nut known as the "ball nut" employing ball bearings in place of conventional nut threading cooperable with a screw formed with threading for receiving said balls has also been found to be satisfactory for use as the nut 91 and the screw 88.

In the modified form of the invention shown in Figs. 5 and 6 a control block 28' is formed with a second sectoral portion 92 diametrically opposite the sectoral portion 37' and radially outwardly of the recess 36' as shown in Fig. 6. This forms axially extending faces 93 and 94. The block 28' is formed with threaded bores 95 and 96 in the faces 93 and 94 respectively, as shown. It will be noted that in the modified form of the invention the torsion bar 46 (see Fig. 2) is not used, and a solid shaft 48' replaces the sleeve 48 of the principal form. The control housing 27' and the shaft 48' are substantially shorter than the housing 27 and the sleeve 48 of the principal form, due to the elimination of the torsion rod.

Referring to Fig. 6 it will be noted that the shaft 48' is formed with a blade 97 similar to the blade 50' projecting diametrically opposite from the latter blade. An adjustable screw plug 98 is threaded into the bore 95, and a similar screw plug 99 is threaded into the bore 96. A compression spring 100 is seated in the bore 95 with one end abutting the plug 98 and has its opposite end in abutment with an angled face of the blade 97 as shown. A compression spring 101 has one end seated in the bore 96 in abutment with the plug 99 and has its opposite end in abutment with the other angled surface of the blade 97, as shown. The compression springs 100 and 101 urge the blade 97 in opposite directions and thereby tend to maintain said blade and the blade 50' in the neutral position shown. The amount of normal compression on the springs 100 and 101 can be varied by screwing the plugs 98 and 99 in or out.

The opposite end of the control block 28' is formed with an integral gear 102 which meshes with the pinion 89 extending through the aperture 87. A tubular extension 29' is formed on the gear 102 and extends axially outwardly therefrom through a suitable bearing 103 in a cover plate 104 which closes the adjacent end of the control housing 27'. The tubular extension 29' is adapted to receive a driven shaft 13' in keyed relationship, and said shaft may be a steering column shaft of a vehicle not otherwise having provision for hydraulic steering. The pump and valve arrangement of the modified form of the invention shown in Figs. 5 and 6 is substantially the same as that shown in Figs. 1 to 4.

In the modified form of the invention manual steering is accomplished by turning the wheel 55' to cause simultaneous rotation therewith of the shaft 48'. Blade 97, acting through springs 100 and 101, the balls 51' and 52' rotates the valve block 28' therewith, said springs, balls 51 and 52, and shaft 13' rotating with the valve block 28' as a unit as long as the resistance to turning shaft 13' is not in excess of that force which the springs 100 and 101 can transmit without deformation. The gear 102 rotates with the valve block 28' and causes simultaneous rotation of the pinion 89 and screw 88 in the opposite direction. Rotation of the screw 88 causes axial movement therealong of the nut 91, and the force bar 90, piston rod 23' and pistons 22' move with the nut 91.

When the resistance to turning of the shaft 13' is such that the rotative force required to be applied thereto to overcome said resistance is in excess of that which the springs 100 or 101 can withstand wihout compressive deformation thereof resulting, turning of the wheel 55', for example, in a clockwise direction as viewed from the right in Fig. 5, causes compression of the spring 101 by the blade 97 and simultaneous movement of the ball 51' onto its seat by the blade 50' as the shaft 44' rotates relative to the valve block 28'.

As the ball 51' closes the mouth of the bore 40' fluid under pressure enters the left hand end of the cylinder 21' through the conduit 60' and forces the pistons 22', piston rod 23' and force bar 90 with its nut 91 to the right as viewed in Fig. 5.

The direction and pitch of the thread on the screw 88 is such that movement of the nut 91 to the right thereon causes counterclockwise rotation of said screw and pinion 89. Counterclockwise rotation of the pinion 89 causes clockwise rotation of the gear 102 which, in turn, rotates therewith the valve block 28' and the shaft 13'. Clockwise rotation of the valve block 28' moves the valve seat formed by the mouth of the bore 40' away from the ball 51' to thereby dissipate the fluid pressure in the passage 42' and conduits 59' and 60', as well as in the cylinder 21', thereby stopping the movement of the pitsons 22'. As the valve block 28' is rotated by the pistons 22', the spring 101 is permitted to expand to its normal length, and the blades 50' and 97 are returned to their normal neutral positions. If, while the spring 101 is compressed, the road resistance decreases to a point below that which caused compression of said spring, the valve block 28' is moved by said spring in a clockwise direction relative to the blades 50' and 97 until said spring is no longer compressed and said blades are again in the neutral position shown in Fig. 6.

When the hand wheel 55' is turned in a counterclockwise direction and the road resistance to turning of shaft 13' exceeds that which the spring 100 can withstand without compression a similar hydraulic steering action takes place. The ball 52' is pressed against its seat and hydraulic pressure forces the pistons 22' to the left as viewed in Fig. 5. This causes clockwise rotation of the pinion 89 and counterclockwise rotation of the gear 102, valve block 28' and shaft 13'. The blades 50' and 97 are returned to their neutral position as the ball 52' moves off its seat, and the spring 100 simultaneously expands to its normal length.

The modified form of the invention provides a compact unit by which hydraulic steering aid can be supplied to a vehicle not otherwise having provision for hydraulic steering aid. It is apparent that when either of the balls 51' or 52' is pressed against its seat, a direct driving connection is provided between the wheel 55' and shaft 13', and since the modified form of the invention embodies the same valve and pumping system as the principal form, manual steering is possible therewith, should the fluid pressure fail for any reason.

Various changes and modifications may be made without departing from the spirit of the invention, and all of such changes are contemplated, as may come within the scope of the claims.

What I claim is:

1. In a power steering mechanism: a fluid pressure operated double acting ram; a first source of fluid under pressure; a second source of fluid under pressure; a unitary movable member connected to said ram and movable therewith, said movable member being formed with a first passage therein communicating with said first source and with one side of said ram and having a first bleeder opening, said movable member also being formed with a second passage therein communicating with said second source and with the other side of said ram and having a second bleeder opening; and manually operated closure means for selectively closing one of said bleeder openings to prevent the escape of fluid therefrom and to cause fluid under pressure to enter the end of said ram communicating with said bleeder opening to move said ram, said movable member being connected to said ram in such a manner that said ram movement causes simultaneous movement of the closed bleeder opening in a direction away from said closure means.

2. In a power steering mechanism: a fluid pressure operated double acting ram; a first source of fluid under pressure; a second source of fluid under pressure; a unitary movable member connected to and movable with said ram, said movable member being formed with a first passage therein communicating with said first source and with one side of said ram and having a first bleeder opening, said movable member also being formed with a second passage therein communicating with said second source and with the other side of said ram and having a second bleeder opening; a closure member for each bleeder opening; and manually operated closure member actuating means for moving a selected closure member into closing position over its bleeder opening to prevent the escape of fluid therefrom and to cause fluid under pressure to enter the end of said ram communicating with said bleeder opening to move said ram, said movable member being connected to said ram in such a manner that said ram movement causes simultaneous movement of the closed bleeder opening in a direction away from its closure member.

3. In a power steering mechanism: a fluid pressure operated double acting ram; a first source of fluid under pressure; a second source of fluid under pressure; a unitary movable member connected to said ram and movable therewith, said member being formed with a first passage therein communicating with said first source and with one side of said ram and having a first bleeder opening, said movable member also being formed with a second passage therein communicating with said second source and with the other side of said ram and having a second bleeder opening spaced from said first bleeder opening; and manually operated means including a member positioned between said bleeder openings for selectively closing one of said bleeder openings to prevent the escape of fluid therefrom and to cause fluid under pressure to enter the end of said ram communicating with said bleeder opening to move said ram, said movable member being connected to said ram in such a manner that said ram movement causes simultaneous movement of the closed bleeder opening in a direction away from said closing means.

4. In a power steering mechanism: a fluid pressure operated double acting ram; a first source of fluid under pressure; a second source of fluid under pressure; a unitary movable member connected to and movable with said ram, said movable member being formed with a first passage therein communicating with said first source and with one side of said ram and having a first bleeder opening, said movable member also being formed with a second passage therein communicating with said second source and with the other side of said ram and having a second bleeder opening spaced from and facing said first bleeder opening; a closure member for each bleeder opening; and a manually operated member positioned between said bleeder openings and between said closure members for moving a selected closure member into closing position over its bleeder opening to prevent the escape of fluid therefrom and to cause fluid under pressure to enter the end of said ram communicating with said bleeder opening to move said ram, said movable member being connected to said ram in such a manner that said ram movement causes simultaneous movement of the closed bleeder opening in a direction away from its closure member.

5. In a power steering mechanism: a fluid pressure operated double acting ram; a first source of fluid under pressure; a second source of fluid under pressure; a unitary movable member connected to and movable with said ram, said movable member being formed with a first passage therein communicating with said first source and with one side of said ram and having a first bleeder opening, said movable member also being formed with a second passage therein communicating with said second source and with the other side of said ram and having a second bleeder opening spaced from and facing said first bleeder opening; a ball closure member for each bleeder opening; and a manually operated member positioned between said bleeder openings and between said balls for moving a selected ball into closing position over its bleeder opening to prevent the escape of fluid therefrom and to cause fluid under pressure to enter the end of said ram communicating with said bleeder opening to move said ram, said movable member being connected to said ram in such a manner that said ram movement causes simultaneous movement of the closed bleeder opening in a direction away from its closure member.

6. In a power steering mechanism: a fluid pressure operated double acting ram; a first source of fluid under pressure; a second source of fluid under pressure; a unitary movable member connected to said ram and movable therewith, said movable member being formed with a first passage therein communicating with said first source and with one side of said ram and having a first bleeder opening, said movable member also being formed with a second passage therein communicating with said second source and with the other side of said ram and having a second bleeder opening; manually operated closure means including a second member normally in neutral position relative to said bleeder openings, said second member being movable away from said neutral position to cause closure of a selected one of said bleeder openings to prevent the escape of fluid therefrom and to cause fluid under pressure to enter the end of said ram communicating with said bleeder opening to move said ram; and a resilient deformable member connected to said movable member and to said second member in a manner to be deformed by movement of said second member away from said neutral position.

7. In a power steering mechanism: a fluid pressure operated double acting ram; a first source of fluid under pressure; a second source of fluid under pressure; a unitary movable member connected to and movable with said ram, said movable member being formed with a first passage therein communicating with said first source and with one side of said ram and having a first bleeder opening, said movable member also being formed with a second passage therein communicating with said second source and with the other side of said ram and having a second bleeder opening; a closure member for each bleeder opening; and a manually operated closure member actuating member normally in neutral position relative to said bleeder openings, said latter member being movable away from said neutral position to move a selected closure member into closing position over its bleeder opening to prevent the escape of fluid therefrom and to cause fluid under pressure to enter the end of said ram communicating with said bleeder opening to move said ram; and a resilient deformable member connected to said unitary movable member and to said closure actuating member in a manner to be deformed by movement of said closure member actuating member away from said neutral position.

8. In a power steering mechanism: a fluid pressure operated double acting ram; a first source of fluid under pressure; a second source of fluid under pressure; a rotatably mounted unitary member connected to and movable with said ram, said movable member being formed with a first passage therein communicating with said first source and with one side of said ram and having a first bleeder opening, said rotatable member also being formed with a second passage therein communicating with said second source and with the other side of said ram and having a second bleeder opening, said first and second bleeder openings being spaced from each other; a closure member for each bleeder opening; a manually operated closure member actuating member mounted for relative rotative movement coaxial with said rotatable member, said member being normally in neutral position relative to said bleeder openings and being rotatable away from said neutral position to move a selected closure member into closing position over its bleeder opening to prevent the escape of fluid therefrom and to cause fluid under pressure to enter the end of said ram communicating with said bleeder opening to move said ram; and at least one spring member connected at one end to said rotatable member and connected at its other end to said actuating member in a manner to be deformed by rotation of said actuating member away from said neutral position.

9. In a power steering mechanism; a fluid pressure operated double acting ram; a first source of fluid under pressure; a second source of fluid under pressure; a rotatably mounted unitary member connected to and movable with said ram, said movable member being formed with a first passage therein communicating with said first source and with one side of said ram and having a first bleeder opening, said rotatable member also being formed with a second passage therein communicating with said second source and with the other side of said ram and having a second bleeder opening, said first and second bleeder openings being spaced from each other; a closure member for each bleeder opening; a manually operated closure member actuating member mounted for relative rotative movement coaxial with said rotatable member and having a portion positioned between said closure members, said portion being normally in neutral position relative to said bleeder openings and being movable away from said neutral position upon rotation of said actuating member relative to said rotatable member to move a selected closure member into closing position over its bleeder opening to prevent the escape of fluid therefrom and to cause fluid under pressure to enter the end of said ram communicating with said bleeder opening to move said ram; and a torsion rod connected at one end to said rotatable member and connected at its other end to said actuating member in a manner to be axially twisted by movement of said actuating member away from said neutral position.

10. In a power steering mechanism: a fluid pressure operated double acting ram; a first source of fluid under pressure; a second source of fluid under pressure; a rotatably mounted unitary member connected to and movable with said ram, said movable member being formed with a first passage therein communicating with said first source and with one side of said ram and having a first bleeder opening, said rotatable member also being formed with a second passage therein communicating with said second source and with the other side of said ram and having a second bleeder opening, said first and second bleeder openings being spaced from each other; a closure member for each bleeder opening; a manually operated closure member actuating member mounted for relative rotative movement coaxial with said rotatable member and having a portion positioned between said closure members, said portion being normally in neutral position relative to said bleeder openings and being movable away from said neutral position, upon rotation of said actuating member relative to said rotatable member, to move a selected closure member into closing position over its bleeder opening, to prevent the escape of fluid therefrom and cause fluid under pressure to enter the end of said ram communicating with said bleeder opening, to move said ram; and a compression spring connected at one end to said rotatable member and connected at its other end to said actuating member in a manner to be compressed by movement of said actuating member in one direction away from said neutral position.

11. In a power steering mechanism: a driven shaft; a reversible power source; mechanism for controlling the operation of said power source, said mechanism including: a movable first member, said power source, said first member, and said driven shaft being connected for simultaneous movement; a second member normally in neutral position relative to said first member and mounted for movement in either of two opposite directions from said neutral position, said controlling means being operable to cause said power source to drive said driven shaft and said first member in one direction when said second member is moved relative to the first member a predetermined amount in said direction away from neutral position; manually operated means for moving said first member; and a resilient deformable member connected to said first and second members in a manner to be deformed by movement of said first member away from said neutral position.

12. In a power steering mechanism: a driven shaft; a reversible power source drivingly connected to said driven shaft; mechanism for controlling the operation of said power source, said mechanism including: a first member; a second member normally in neutral position relative to said first member and mounted for rotation a predetermined amount in either direction from said neutral position, said controlling means being operable to cause said power source to drive said driven shaft in one direction when said second member is rotated relative to the first member said predetermined amount away from neutral position; manually operated means for rotating said first member; and a torsion rod connected to said first and second members in a manner to be axially twisted by rotation of said first member away from said neutral position.

13. In a power steering mechanism: a driven shaft; a double acting fluid operated ram; a source of fluid under pressure; a steering wheel; a lost-motion steering linkage connecting said wheel with said driven shaft, said linkage including: a valve communicating with said ram and with said source for controlling the flow of fluid from said source to said ram, said valve, said ram, and said driven shaft being connected for simultaneous movement, and said valve having abutment means; movably mounted valve actuating means drivingly connected to said wheel and normally positioned in neutral position spaced from said abutment means, said actuating means being mounted for rotation with said wheel into engagement with said valve abutment means to provide a direct driving connection between said wheel and said driven shaft through said valve and also providing simultaneous actuation of said valve; and a resilient deformable member connected to said valve and to said actuating means in a manner to be deformed by movement of said actuating means away from said neutral position.

14. In a power steering mechanism: a driven shaft; a double acting fluid operated ram; a source of fluid under pressure; a steering wheel; a lost-motion steering linkage connecting said wheel with said driven shaft, said linkage including: a valve communicating with said ram and with said source for controlling the flow of fluid from said source to said ram, said valve, said ram, and said driven shaft being connected for simultaneous movement, and said valve having abutment means; movably mounted valve actuating means drivingly connected to said wheel and normally positioned in neutral position spaced from said abutment means, said actuating means being mounted for rotation of said wheel into engagement with said valve abutment means to provide a direct driving connection between said wheel and said driven shaft through said valve and also providing simultaneous actuation of said valve; and a compression spring having one end in engagement with said valve and having its other end in engagement with said actuating means in a manner to be compressed by movement of said actuating means away from neutral position.

15. In a power steering mechanism: a double acting fluid operated ram drivingly connected to said driven shaft; a source of fluid under pressure; a steering wheel; a lost-motion steering linkage connecting said wheel with said driven shaft, said linkage including: a valve communicating with said ram and with said source for controlling the flow of fluid from said source to said ram, said valve being drivingly connected to said driven shaft and having an abutment means; valve actuating means drivingly connected to said wheel and normally positioned in neutral position spaced from said abutment means, said actuating means being mounted for rotation with said wheel into engagement with said valve abutment means to provide a direct driving connection between said wheel and said driven shaft through said valve and simultaneous actuation of said valve; and a torsion rod fixed at one end to said valve and fixed at its other end to said actuating means in a manner to be axially twisted by rotation of said actuating means away from said neutral position.

16. In a power steering mechanism: a driven shaft; a reversible power source; a steering wheel; a lost motion steering linkage connecting said wheel with said driven shaft, said linkage including: a control unit, said unit, said driven shaft and said source being connected for simultaneous movement, said unit also being connected to the power source in a manner to control the operation of the latter, said unit having contact means for causing operation of said power source upon actuation of said contact means; and movably mounted actuating means drivingly connected to said wheel and having an abutment portion normally positioned in neutral position spaced from said contact means, said actuating means being movable by said wheel to move the abutment portion of said actuating means into engagement with said contact means to provide a direct driving connection between said wheel and said driven shaft through said control unit and to cause simultaneous actuation of said contact means and thereby cause operation of said power source.

17. In a power steering mechanism: a driven shaft; a reversible power source; mechanism for controlling the operation of said power source, said mechanism including: a movable first member, said power source, said first member, and said driven shaft being connected for simultaneous movement; a second member normally in neutral position relative to said first member and mounted for movement in either of two opposite directions from said neutral position, said controlling means being operable to cause said power source to drive said driven shaft and said first member in one direction when said second member is moved relative to the first member a predetermined amount in said direction away from neutral position; manually operated means for moving said first member; and a compression spring having one end in engagement with said first member and having its other end in engagement with said second member in a position to be compressed by movement of said first member away from said neutral position.

18. In a power steering mechanism: a driven shaft; a reversible power source drivingly connected to said driven shaft; mechanism for controlling the operation of said power source, said mechanism including: a first member; a second member normally in neutral position relative to said first member and mounted for rotation a predetermined amount in either direction from said neutral position, said controlling means being operable to cause said power source to drive said driven shaft in one direction when said second member is rotated relative to the first member said predetermined amount away from neutral position; manually operated means for rotating said first member; and a compression spring having one end in engagement with said first member and having its other end in engagement with said second member in a position to be compressed by rotation of said first member away from said neutral position.

19. In a power steering mechanism: a fluid pressure operated double acting ram; a first source of fluid under pressure; a first conduit means connecting said first source to one side of said ram, said conduit means being formed with a bleeder opening; a second conduit means connecting said second source with the other side of said ram, said second conduit means also being formed with a bleeder opening; manually operated means for selectively closing one of said conduit bleeder openings to prevent the escape of fluid therefrom and to cause fluid under pressure to enter the end of said ram communicating with said bleeder opening; an inlet check valve connected to one end of said ram; and an inlet check valve connected to the other end of said ram, said check valves preventing locking of said ram during failure of said fluid pressure source and closure of one of said bleeder openings.

ERVING A. PUERNER.

References Cited in the file of this patent

UNITED STATES PATENTS

| Number | Name | Date |
|---|---|---|
| 1,890,041 | McLeod | Dec. 6, 1932 |
| 1,952,034 | Bragg | Mar. 20, 1934 |
| 2,020,951 | Lemon | Nov. 12, 1935 |
| 2,274,734 | Esnault-Pelterie | Mar. 3, 1942 |
| 2,354,992 | Gottlieb | Aug. 1, 1944 |
| 2,432,502 | Bentley | Dec. 16, 1947 |
| 2,465,761 | Staude | Mar. 29, 1949 |
| 2,511,660 | Wilson | June 13, 1950 |
| 2,554,843 | Staude | May 29, 1951 |